United States Patent [19]
Deibler et al.

[11] 3,741,243
[45] June 26, 1973

[54] BALL CHECK VALVE ASSEMBLY

[75] Inventors: Robert R. Deibler, Loudonville; Tom W. Patterson, Hayesville, both of Ohio

[73] Assignee: Hydr-O-Matic Pump Company, Hayesville, Ohio

[22] Filed: Apr. 26, 1971

[21] Appl. No.: 137,331

[52] U.S. Cl. .............................................. 137/528
[51] Int. Cl. ........................................... F16k 15/04
[58] Field of Search............ 137/519.5, 528, 533.11, 137/533.13, 533.15, 539, 539.5

[56] References Cited
UNITED STATES PATENTS

| | | | |
|---|---|---|---|
| 2,891,565 | 6/1959 | Mackey | 137/533.11 X |
| 2,354,255 | 7/1944 | Gillum | 137/528 X |
| 3,498,315 | 3/1970 | Graves et al. | 137/533.11 X |
| 1,839,730 | 1/1932 | Baten et al. | 137/533.11 X |

*Primary Examiner*—Robert G. Nilson
*Attorney*—Oldham & Oldham

[57] ABSTRACT

A check valve assembly which consists of a housing having inlet and outlet ports connected by an internal chamber and a ball contained within the chamber and movable between a position intermediate the inlet and outlet ports and a valve seat at the inner end of the inlet port. The chamber includes a bypass of large cross-sectional area to permit liquid flow around the ball when the valve is in its open position.

3 Claims, 3 Drawing Figures

PATENTED JUN 26 1973　　　3,741,243

INVENTORS
ROBERT R. DEIEBLER
TOM W. PATTERSON
BY
OLDHAM & OLDHAM
ATTORNEYS

BALL CHECK VALVE ASSEMBLY

Ball valves are one type of an inexpensive valve that can provide effective valving action in many types of pumping systems.

When check valves are used in piping systems which carry liquids containing solid particles, the valves must provide large cross-sectional flow passages for liquid flow in the normal direction so that the solid particles do not become trapped in the valve assembly, obstructing liquid flow. In addition, both the valve seat and the free head must be free of solids so that proper closing of the valve occurs upon reverse flow in the piping system.

It is the primary object of the present invention to provide a check valve assembly which is capable of handling liquids containing solid particles, and which is readily self-cleaning.

It is also an object of the invention to provide an improved check valve assembly which is inexpensive to manufacture and trouble free in operation.

The above and other objects of the invention which will become apparent in the following detailed description are achieved by providing a check valve assembly which consists, essentially, of a housing having inlet and outlet ports connected by an internal chamber and a ball confined within the chamber. The ball is guided by the chamber walls and moves from an intermediate position during normal flow to a sealing position at the end of the inlet port during reverse flow. The chamber also includes a large cross-sectional area bypass to permit liquid flow around the ball during flow in the forward direction.

For a more complete understanding of the invention and the objects and advantages thereof, reference should be had to the following detailed description and the accompanying drawing wherein there is shown a preferred embodiment of the invention.

Figure 1:
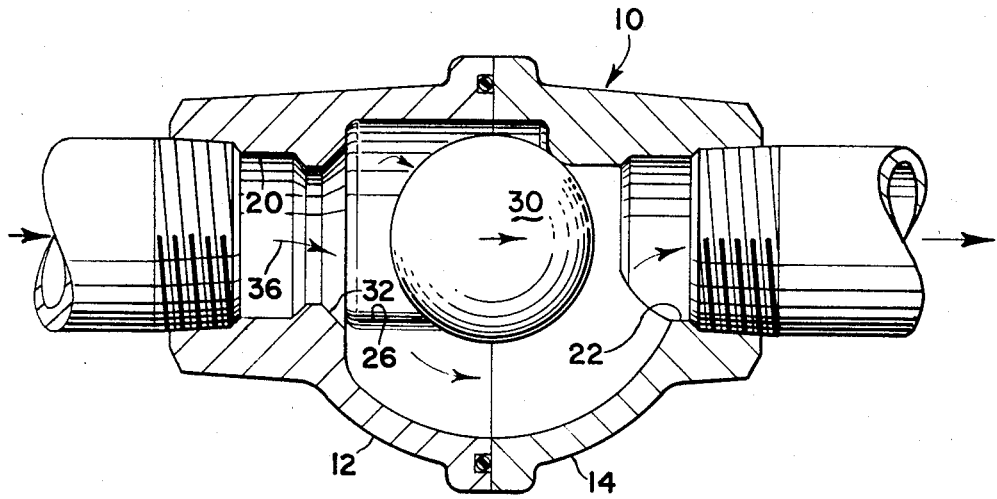
FIG. 1 is a longitudinal cross-sectional view of the check valve assembly of the present invention, showing the valve in its open position.

The valve assembly, designated generally by the reference numeral 10, includes a pair of casings 12 and 14 which are joined together by bolts 16. An 0-ring or other sealing means 18 is preferably provided between the mating surfaces of the casing sections 12 and 14. The casing section 12 is provided with an inlet port 20 while the casing section 14 is provided with an outlet port 22. The two casing sections 12 and 14, when joined together, define a chamber 24. The chamber 24 includes a generally cylindrical portion 26 extending inwardly from the inner end of the inlet port 20 to a point 28 spaced from the inner end of the outlet port 22. The walls of this cylindrical portion 26 serve to guide and limit movement of a ball 30 in the chamber. The inner end of the inlet port 20 is formed into a spherical seat 32 for mating with the ball 30 and the inner end 28 of the cylindrical portion 26 serves as a stop for the inward movement of the ball 30. The chamber 24 also includes an offset enlarged portion 34 which extends from the inlet port 20 beside the cylindrical portion 26 to the outlet port 22, but which portion 34 is smaller in width than the ball diameter.

Figure 2:
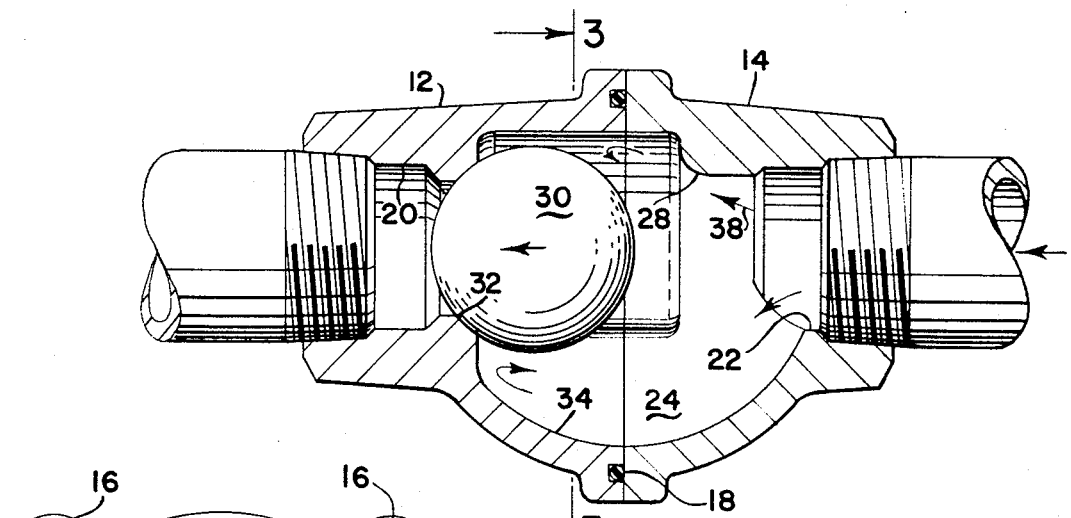
FIG. 2 is a view, similar to that of FIG. 1, but showing the valve in its closed position.
Figure 3:
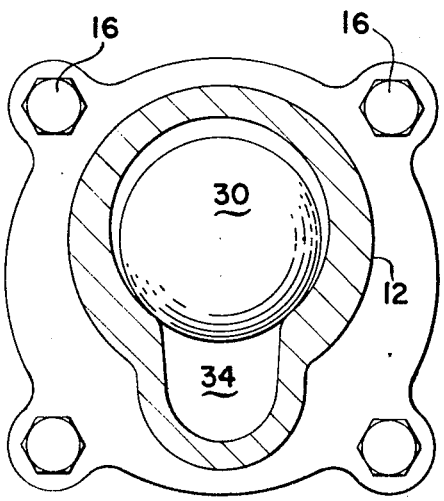
FIG. 3 is a transverse sectional view taken along the line 3—3 of FIG. 1.

Liquid flow in the normal direction, as indicated by the arrow 36 of FIG. 1, forces the ball inwardly along the cylindrical portion 26 to the rear stop 28 permitting unrestricted liquid flow through the valve 10. The flow is from the inlet port 20 through the bypass portion 34 of the chamber 24 to the outlet port 22. Upon commencement of fluid flow in the reverse direction, as indicated by the arrow 38 of FIG. 2, the ball 30 moves toward the seat 32 at the inner end of the inlet opening 20 under the pressure of the incoming liquid. As the ball 30 moves toward the seat 32 the cross-sectional area between the seat 32 and the ball 30 at the end of the bypass portion 34 of the channel 24 decreases creating a venturi across this region. As a result of this venturi action there is a decrese in pressure on the ball 30 in the region of the seat 32 and this decreased pressure aids in the closing of the valve.

As can be seen from the above description, the check valve assembly of the present invention is characterized by its simplicity of construction and operation. Liquid flow through the valve and the valve construction is such as to be self-cleaning at the valve seat area. The valve includes only three major components and eliminates the need for any springs, pivotal connections between the valve head and the valve body, or other components which may be potential sources of trouble. When the valve is in its open position, there is a large cross-sectional path through the valve so that liquid and any solid particles entrained in the liquid can freely pass through the valve. Both the valve seat and the ball are directly in contact with liquid flowing through the valve and the forward direction and are thus washed by the liquid so that solid particles do not become trapped or deposited and complete closing of the valve on reverse flow is assured.

While only the best known embodiment of the invention has been illustrated and described in detail, the invention is not so limited. Reference should therefore be had to the appended claims in determining the true scope of the invention.

What is claimed is:

1. A check valve assembly including a valve casing having an inlet port and only one outlet port and an internal chamber connecting the inlet and outlet ports, and characterized by the chamber including a cylindrical portion extending inwardly from the inner end of the inlet port to a point spaced from the inner end of the outlet port;

a ball of greater diameter than the diameter of the inlet port, the ball being confined by and movable in the cylindrical portion of the chamber for movement on an axis extending between the inlet and outlet ports; and the chamber further including only one eccentric bypass portion starting at and extending from the inner end of the inlet port, extending along beside the cylindrical portion of the chamber, and communicating with the outlet port, the bypass portion being closed when the ball is in contact with the inner end of the inlet port and providing a fluid flow path of large cross sectional area when the ball is in its innermost position, liquid flow through said bypass portion providing a cleaning action on said ball.

2. The check valve assembly according to claim 1 wherein the inlet and outlet ports are in substantial axial alignment, the valve casing comprises a pair of casing sections, one section including the inlet port and the other section including the outlet port, the bypass portion being in communication with the cylindrical portion of the chamber for flow of liquid along a peripheral portion of said ball in one direction when liquid flows through the valve.

3. A check valve assembly, comprising a valve casing having an inlet port and only one outlet port and an internal chamber connecting the inlet and outlet ports each having an inner end and characterized by the chamber including a generally cylindrical portion of greater diameter than the inlet and outlet ports extending axially inward from the inner end of the inlet port to a point spaced from the inner end of the outlet port and a sole bypass portion of lesser width than the diameter of the cylindrical portion extending from the inner end of the inlet portion beside the cylindrical portion and to the inner end of the outlet port, the cylindrical and bypass portions being in full communication along their entire lengths;

a ball received in the cylindrical portion of the chamber and of a diameter less than of the cylindrical portion but greater than the diameter of the inlet port and greater than the width of the bypass portion, the inner end of the inlet port being a spherical segment for mating with the ball, and said valve casing being made in two parts, and said cylindrical portion is partly formed in each of said casing parts, the liquid flow path being in one direction along a peripheral portion of the ball for a cleaning action thereon; said check valve functioning in any position.

* * * * *